G. W. CURTIS.
ANIMAL TRAP.
APPLICATION FILED JUNE 16, 1919.

1,323,024.

Patented Nov. 25, 1919.
2 SHEETS—SHEET 1.

INVENTOR.
George W. Curtis

BY

ATTORNEYS.

G. W. CURTIS.
ANIMAL TRAP.
APPLICATION FILED JUNE 16, 1919.
1,323,024.
Patented Nov. 25, 1919.
2 SHEETS—SHEET 2.
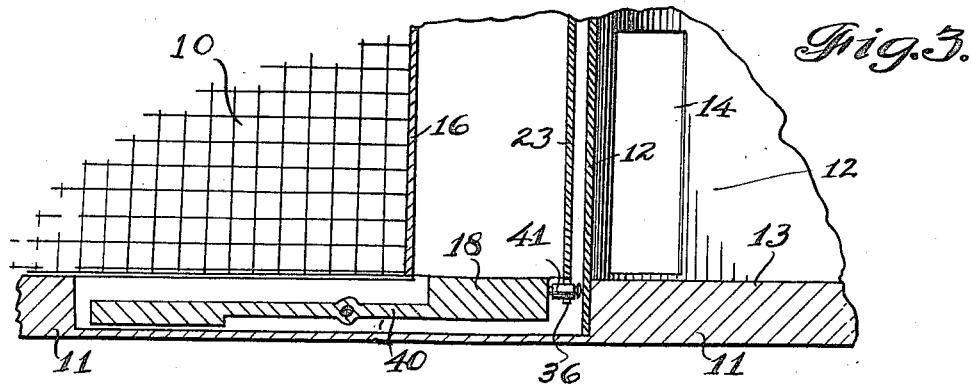
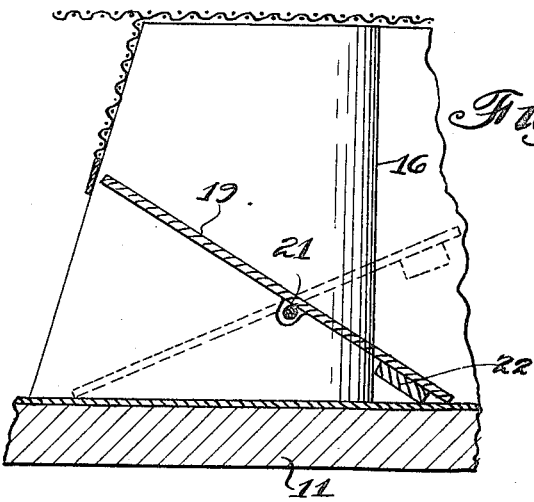
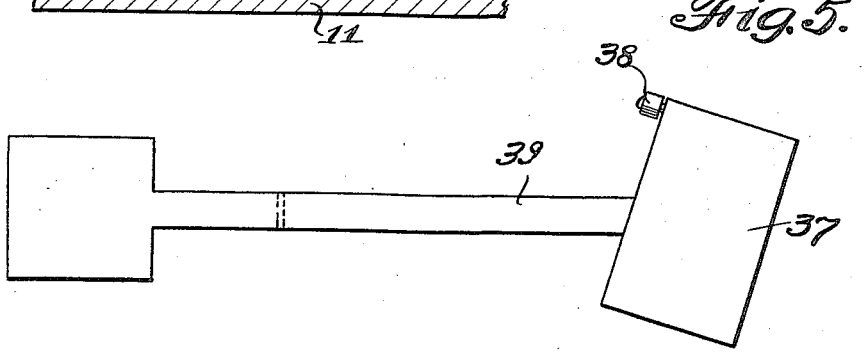
INVENTOR.
George W. Curtis
BY
ATTORNEY.

UNITED STATES PATENT OFFICE.

GEORGE W. CURTIS, OF BOULDER, COLORADO.

ANIMAL-TRAP.

1,323,024.　　　　Specification of Letters Patent.　　Patented Nov. 25, 1919.

Application filed June 16, 1919. Serial No. 304,420.

*To all whom it may concern:*

Be it known that I, GEORGE W. CURTIS, a citizen of the United States, residing at Boulder, in the county of Boulder and State of Colorado, have invented new and useful Improvements in Animal-Traps, of which the following is a specification.

This invention relates to animal traps of the self-setting type, and its object is to provide a simple and highly efficient trap of this kind.

The object stated is attained by means of a novel combination and arrangement of parts to be hereinafter described and claimed, and in order that the same may be better understood, reference is had to the accompanying drawings, forming a part of this specification.

Figure 1:
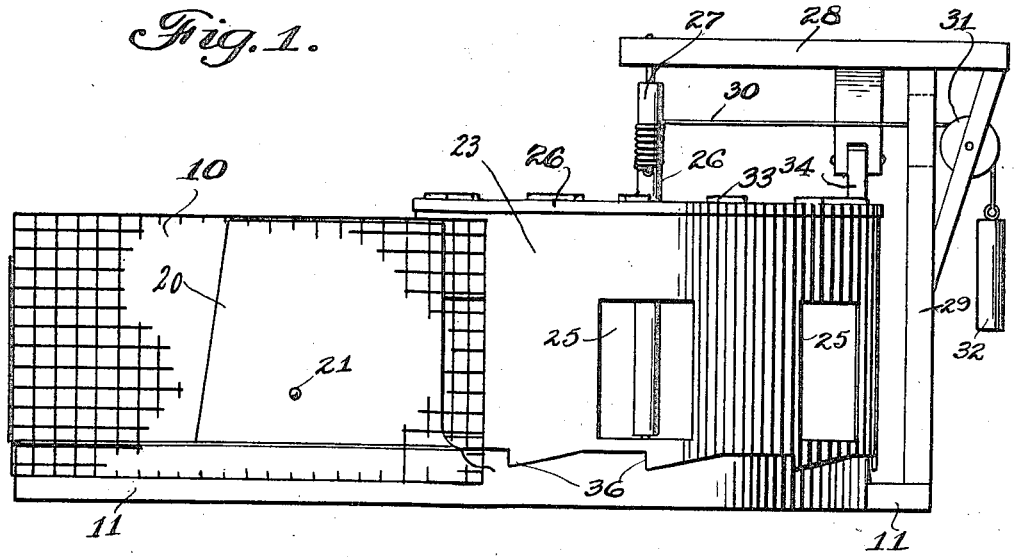
Figure 1 is a side elevation of the trap.
Figure 2:
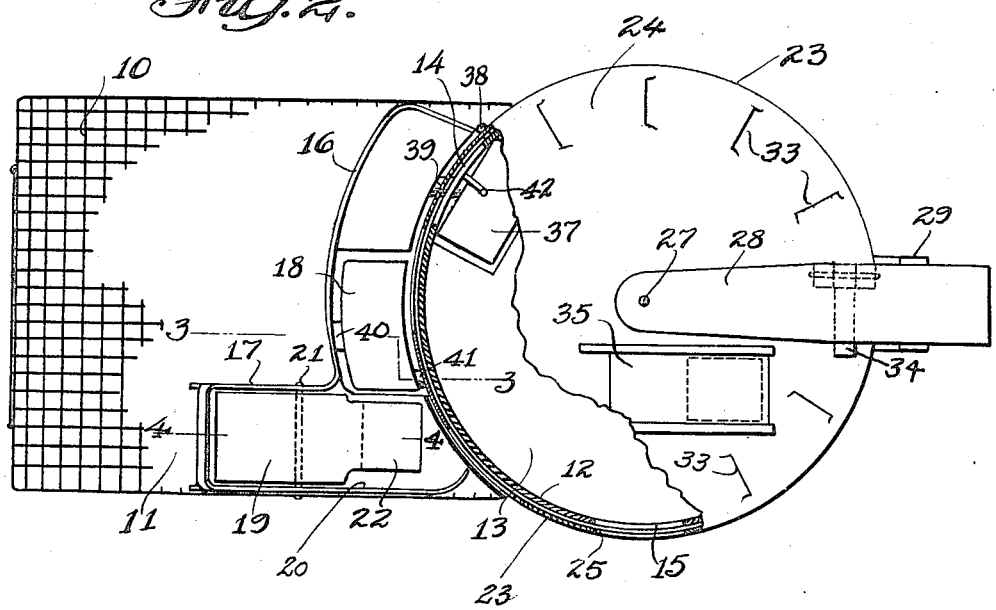
Fig. 2 is a plan view, partly in section.

Figs. 3 and 4 are enlarged sections on the lines 3—3 and 4—4, respectively, of Fig. 2, and Fig. 5 is a plan view of tiltable member.

Referring specifically to the drawing, 10 denotes a cage or inclosure constructed of wire fabric or other suitable open-work material, and mounted on a floor 11. Adjacent to one end of the cage is a circular inclosure or entrance chamber supported by the floor 11 and consisting of a side wall 12 and a floor 13. The sides of the cage 10 extend up to the side wall 12, and between the former the latter has an exit opening 14 through which the animals pass into the cage. Outside the cage 10, the wall 12 has a number of openings 15 through which the animals enter the inclosure.

Inside the cage 10, opposite that portion of the inclosure wall 12 which extends thereinto, and spaced from the latter, a wall 16 extends between the top and the bottom of the cage, from one side wall thereof to the opposite side wall along which latter, and spaced therefrom, it extends for a short distance, as shown at 17. This wall defines a passageway from the exit 14 of the entrance chamber into the cage. That portion of the passageway which is alongside the wall 12 has a vertically tiltable platform 18 seating in a recess in the floor of the passageway and normally flush therewith. That portion of the passageway which runs along one side of the cage opens into the latter, and contains a tiltable barrier 19. On the last-mentioned side of the cage is a plate 20 which forms the outer wall of the passageway. The barrier 19 fits between the wall 17 and the plate 20 and has a pivot 21 supported thereby. The barrier 19 is weighted at one end, as shown at 22, so that it normally seats at this end on the floor of the passageway and extends therefrom with an upward inclination to the exit end of the passageway, thereby blocking the passage of the animal into the cage 10. However, when the animal mounts the barrier and passes the pivot thereof, the barrier tilts and its end which is at the exit end of the passageway lowers and allows the animal to pass into the cage. The barrier then tilts back to its normal position to cut off the escape of the animal from the cage back into the passageway.

Over the wall 12, on the outside thereof, rotatably fits a drum or cylinder 23 open at the bottom and having a closed top 24. In this cylinder are side openings 25 spaced to conform to the spacing of the openings 15 so that they may register therewith when the drum is rotated a certain distance. A further rotation of the drum brings the imperforated portion thereof over the openings 15 and thus closes the latter.

The drum 23 is supported by a central vertical shaft 26 fastened to the top 24 thereof and stepped at the bottom in the floor 13. The drum is fast on the shaft 26, and the upper end of the latter extends a short distance from the top of the drum, as shown at 27, and is supported by a bracket arm 28 carried by an upright 29 rising from the floor 11.

Around the upper end 27 of the shaft 26 is wound a line 30 passing over a pulley 31 and having attached to its depending end a weight 32. These parts constitute a weight-motor for rotating the drum 23 when the latter is released as will be presently described.

On the top 24 of the drum 23 are ratchet lugs 33 which are engageable by a pivoted pawl 34 carried by the bracket arm 28. The top of the drum also has an opening for facilitating baiting of the trap, said opening being provided with a sliding cover 35. The pawl 34 operating in conjunction with the lugs 33 prevents the drum from rotating otherwise than in one direction only.

On the bottom edge of the drum 23 are ratchet teeth 36, and in a recess in the floor 13 is set a tiltable platform 37 from one end of which extends a detent arm 38 over which the bottom edge of the platform rides. This platform is carried by a pivoted counterweighted arm 39 seating in a recess in the floor 11. The platform 37 is normally flush with the floor 13, and when in this position, the detent engages one of the ratchet teeth 36, so that the drum 23 is now locked and prevented from being rotated by the weight motor hereinbefore described. When the animal steps on the platform 37 and depresses the same, the detent 38 lowers and clears the ratchet tooth 36 with which it was in engagement, to release the drum.

The platform 18 is also carried by a pivoted counterweighted arm 40 seating in a recess in the floor 11 and it has a detent arm 41 engageable with the ratchet teeth 36 in the same manner as the detent 38. The detents may be fitted with anti-friction rollers as shown.

In front of the platform 37 is a hook 42 for supporting the bait and attracting the animal to the platform. The bait hook is so positioned that the animal must step on the platform in attempting to reach the bait.

The exit opening 14 is so positioned that the drum 23 closes the same when the openings 15 and 25 are registering.

The trap being baited it is set by rotating the drum 23 in a direction to wind the line 30 in the shaft end 27, until the weight 32 is at the highest point and the openings 15 and 25 are registering. The animal entering through these openings is attracted by the bait to the platform 37 and upon stepping thereon the platform tilts, whereupon the detent 38 clears the ratchet tooth 36 with which it was in engagement. It will be noted that the ratchet teeth are not engageable simultaneously by the detents 38 and 41, but said detents engage the ratchet teeth alternately. The drum being released by the lowering of the detent 38 is now rotated by the weight motor until it is stopped by the detent 41. The parts are so proportioned that this movement of the drum is just enough to bring the imperforate portion of the drum in front of the openings 15 to close the same, and to bring one of the openings 25 into registry with the opening 14. The passageway to the cage 10 is now open and the animal enters the latter after passing the barrier 19 as hereinbefore described. Before passing the barrier 19, the animal steps on the platform 18 and depresses the same, whereupon the detent 41 swings clear of the ratchet tooth 36 it was engaging, and the drum 23 is given another turn by the weight motor until it is stopped by the detent 38. The last described movement of the drum again brings the openings 15 and 25 into registry, and the trap is now reset and ready for the next victim.

I claim:

An animal trap comprising a cage, an entrance chamber having an inlet and an outlet, a passageway leading from the outlet into the cage, a rotatable drum surrounding the entrance chamber and having openings adapted to register alternately with the inlet and the outlet, the bottom edge of the drum having ratchet teeth, means for rotating the drum, tiltable platforms in the entrance chamber and in the passageway, and detents on the platform extending across the bottom edge of the drum and engageable with the ratchet teeth thereof for controlling the movement of the drum.

In testimony whereof I affix my signature.

GEORGE W. CURTIS.